United States Patent [19]
Su et al.

[11] Patent Number: 5,953,688
[45] Date of Patent: Sep. 14, 1999

[54] MULTI-PORT DATA COLLECTION SYSTEM

[75] Inventors: Song-Kung Su, Taipei; Te-Hua Wang, Taoyuan Hsien, both of Taiwan

[73] Assignee: Institute for Information Industry, Taipei, Taiwan

[21] Appl. No.: 08/852,528

[22] Filed: May 7, 1997

[30] Foreign Application Priority Data

Aug. 9, 1996 [TW] Taiwan ................................. 85212169

[51] Int. Cl.$^6$ ...................................................... G06F 9/38
[52] U.S. Cl. .......................................... 702/185; 702/188
[58] Field of Search ........................ 395/183.13, 183.16, 395/183.01, 183.2, 500; 702/186, 81–84, 118–120, 122, 182, 183, 185–188; 364/468.16, 468.17; 371/22.1, 22.2

[56] References Cited

U.S. PATENT DOCUMENTS

| 3,764,995 | 10/1973 | Helf, Jr. et al. ........................ 702/122 |
| 4,899,306 | 2/1990 | Greer ...................................... 371/22.2 |
| 5,210,757 | 5/1993 | Barlow et al. ...................... 395/183.01 |
| 5,353,240 | 10/1994 | Mallory et al. ......................... 702/186 |

*Primary Examiner*—John Barlow
*Assistant Examiner*—Craig Steven Miller
*Attorney, Agent, or Firm*—Birch, Stewart, Kolasch & Birach, LLP

[57] ABSTRACT

A multi-port data collection system serves as a PC real-time burn-in testing system. It is used to overcome the conventional burn-in system disadvantages of excessive manpower requirements and low efficiency. The system includes a monitoring device to real-time monitor the burn-in states of a plurality of PCs undergoing testing. Each PC being tested executes a program to perform the burn-in test and generate test data representing the test results. After collecting the data, the monitoring device displays the result of each machine undergoing testing using windows on the monitor screen. Using the multi-port data collection system of the present invention, the maximum number of machine undergoing testing exceeds 4096. The present invention can real-time display the states of machines being tested, record data automatically, and help to handle the production state. This test data can also be used to analyze why a particular error occurs and to determine the failure percentage of machines. Therefore, the yield is improved and the production cost is reduced. Because the present invention can collect and record the test results automatically, it can effectively handle the production record-keeping and data analysis.

15 Claims, 10 Drawing Sheets

MULTI-PORT DATA COLLECTION SYSTEM

BACKGROUND OF THE INVENTION

1. Field of the Invention

The present invention relates in general to a PC burn-in machine, and more particularly, to a PC burn-in machine for real-time monitoring and response through hierarchical data collection and management via a monitoring device.

2. Description of the Related Art

To increase processing power and add various functions, many devices contain microprocessors, or called central process units (CPUs), for example, fax machines, personal computers (PCs) and scanners. Before these products are packaged and shipped to other sites, they will usually be tested for a long time (for example, 8–72 hours) under the control of functional test programs. In addition, during this testing period, some manufacturers even place these products in a burn-in room, testing the reliability of the components contained in these machines at unusual conditions, such as high temperatures. The burn-in process can discover beforehand some constituent components or design schemes that would fail within a very short time after these products were sold. In other words, the product lifetime is enhanced.

To incorporate with the entire manufacturer environment, the conventional PC burn-in system utilizes on-line testing. The undergoing testing PC is placed on a conveyor belt, and supplied via a plug on a line board connected to the power rail of the conveyor belt. Then a built-in or external testing program is repeatedly applied to the undergoing testing PC.

Manufacturers having enough storage space usually utilize the scheme of directly conveying PCs into a burn-in room through the conveyor belt for functional testing. Such a scheme may be done by automation, but can not be adopted by all PC manufacturers. For manufacturers not having enough space, burn-in testing is more complicated. Basically, PCs are tested by means of platform vehicles. After packaging and basic testing, all machines are sequentially put on the platform vehicle. The platform vehicle has wheels and 4 to 6 layers. When the platform vehicle is full of the machines to be tested, the platform vehicle is directed to the burn-in room. After being supplied by the required power, all machines on the platform vehicle start to undergo the burn-in test. Depending on the size of the tested machines, there may be 16 to 128 machines undergoing the functional test on a platform vehicle, and there may be 10 to 40 platform vehicles in the burn-in room. Generally, the total number of the machines undergoing the burn-in test are quite large. Each machine undergoing the burn-in test has its own maintenance card. When errors occur, an error message will be shown on a LCD panel or the screen freezes. Then inspectors in the burn-in room will record the error condition of each tested machine on its maintenance card. It is obvious that this method wastes a lot of man power and easily creates mistakes. In addition, it is not convenient to analyze the recorded data because the data must be typed into an analyzer. Furthermore, even if most of tested machines are very stable and reliable, it is hard to shorten the burn-in time (for example, from 24 hours to 6 hours) because of lack of data for confirming 99% of the problems that occur within 6 hours. In summary, the conventional burn-in test system has the following disadvantages:

1. It is time consuming because inspection and recording are both done manually;
2. It may be harmful to worker health because of the high temperature involved;
3. Only one error data can be recorded at a time (usually, the display screen freezes when any error occurs);
4. It is difficult to analyze the result; and
5. Energy is wasted since a large number of machines are tested and the burn-in time is long.

SUMMARY OF THE INVENTION

To overcome the above-indicated disadvantages, it is one object of the present invention to provide a multi-port data collection system for detecting real-time testing conditions and recording data automatically.

During burn-in test, the machine undergoing testing is running a testing program to inspect each functional state of itself. The test result is then stored in some device(for example, a disk), or in a memory device. Therefore, in the present invention, a resident program is used to capture the test data and transfer them to a RS232 port. When the result will be stored on hard disks or in memory devices, a special program is added to the testing program to send the test result to the RS232 port in a format in accordance with the present invention.

Another object of the present invention is to provide a multi-port data collection system to record how many times errors occur and when the errors occur. The error cause and the failure percentage are understood by the analysis system, which may be used to improve the production yield and reduce the production cost. The present invention can also be readily incorporated with a bar code system in factories, which may be used to send the error message to the maintenance station through a network. Therefore, the present invention is conducive to factory automation, allowing for paperless management. The present invention is also used to save a large amount of energy by shortening the functional test time. The present invention is also in line with the spirit of the ISO quality standardization by effectively preserving the production records and analyzed data for quality-control analysis. The present invention can also be used to improve the management efficiency.

In order to achieve the above-indicated objectives, the present invention provides a multi-port data collection system for monitoring states of a plurality of machines undergoing testing. Each machine undergoing testing executes a program to test its functions and sends out the test result in a hierarchical manner. The data collection system includes a monitoring device, a first module controlled by the monitoring device via a first data interface and a plurality of second modules controlled by the first module via a second data interface and connected to the machines being tested via a third data interface. Each second module comprises a microcontroller for controlling a data-collecting sequence, an indicator for showing a state message, a memory device serving as a register for the test result, a second data interface circuit connected between the second data interface and the microcontroller, and a third data interface circuit connected between the third data interface and the microcontroller. In addition, the second module further comprises an identification code circuit.

In addition, the present invention also provides a PC burn-in real-time monitoring system for real-time monitoring burn-in states of a plurality of PCs undergoing testing. Each PC being tested executes a program to test its functions and generates a test data representing the burn-in test results. The burn-in monitoring system comprising a plurality of wireless transmitters for receiving the test data generated by the PCs undergoing testing and for transmitting the test data by radio or infrared, a plurality of wireless receivers for receiving the test data from the wireless transmitters, a hierarchical network for receiving the test data from wireless receivers and transmitting the test data by wire, and a monitoring device for collecting the test data from the hierarchical network, and analyzing and displaying the test data. A plurality of devices for capturing the test data generated by the test program executed in the PCs undergoing testing and for sending said data to the corresponding wireless transmitters, respectively. Such a capturing means executes a resident program to capture the test data via interrupt.

BRIEF DESCRIPTION OF THE DRAWINGS

Other objects, features, and advantages of the present invention will become apparent from the following detailed description which is made with reference to but not limited by the following embodiment. The description is made with reference to the accompanying drawings, in which.

DESCRIPTION OF THE PREFERRED EMBODIMENT

Figure 1:
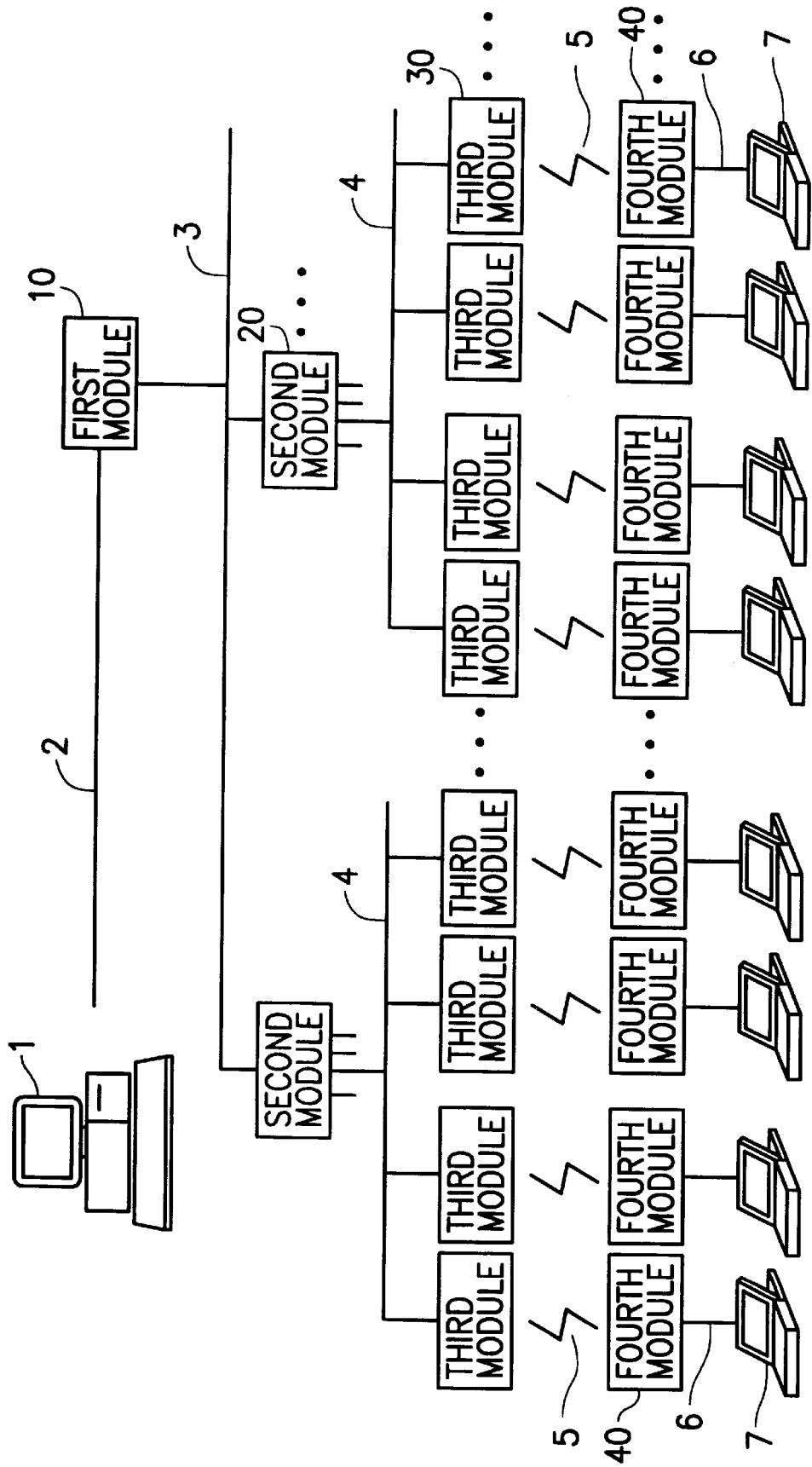
FIG. 1 is a system block diagram of the multi-port data collection system in accordance with the present invention using the conveyor belt scheme during burn-in testing.

FIG. 1 shows the system block diagram of the multi-port data collection system using the conveyor belt scheme during burn-in testing. As shown in FIG. 1, monitoring device 1 monitors the states of the PCs 7 undergoing testing. The test results generated by PCs 7 are sent to monitoring device 1 via a hierarchical network structure including fourth modules 40, third modules 30, second modules 20 and a first module 10. Generally speaking, PCs 7 undergoing testing are placed on a conveyor belt and are in motion. Such a scheme is used to match the present production sequence. A test program is executed in each PC 7 to conduct burn-in testing for a long period. When the test program detects a functional error on the tested PC 7, this error information carried by an error signal is sent to the corresponding fourth module 40 via interface 6, for example, an RS-232 interface, which is the most common interface in a PC. Fourth modules 40 are located on a line board together with the PCs 7 undergoing testing. Therefore, each fourth module 40 will move with the associated PC 7 at the same rate of speed. When fourth modules 40 receive the error signals from the associated PCs 7, fourth modules 40 transform the error signals into a wireless transmission form, for example, radio frequency (RF), infrared radiation, or the like, received by a receiver built in third modules 30. In this embodiment, the wireless transmission uses infrared interface 5. The reason why a wireless transmission is used between fourth modules 40 and third modules 30 is that fourth modules 40 and PCs 7 are in a moving state. However, third module 30 is fixed on a burn-in machine relative to each associated location.

After third modules 30 receive the error signals, the error signals are collected by second modules 20 via interface 4. In this embodiment, interface 4 is an RS485 interface. The reason is that the RS485 interface utilizes a differential transmission mode and has a transmission range reaching 4000 feet of transmission speed of 100 kb, enough to establish a long distance monitoring system. Each RS485 has 4 ports. Each port can connect up to 32 terminals and form a data loop. The data loop is formed by connecting the head terminal and the tail terminal with 120Ω dummy load. Port access in each RS485 interface is usually employed by time-division scheme. Each second module 20 has 4 ports, and each port can connect up to 32 sets of third modules 30. When second modules 20 collect the data from the maximum number of third modules 30, 128 sets, the data are then sent to first module 10 via an RS485 interface 3. In summary, first module 10 can connect up to 32 sets of second modules 20, therefore, the burn-in test system can simultaneously handle up to 4096 (128×32=4096) sets of PCs 7 undergoing testing. Then first module 10 connects monitoring device 1 via an interface 2 (for example, an RS232 interface). Accordingly, the data will be collected, analyzed, and displayed.

Figure 3:
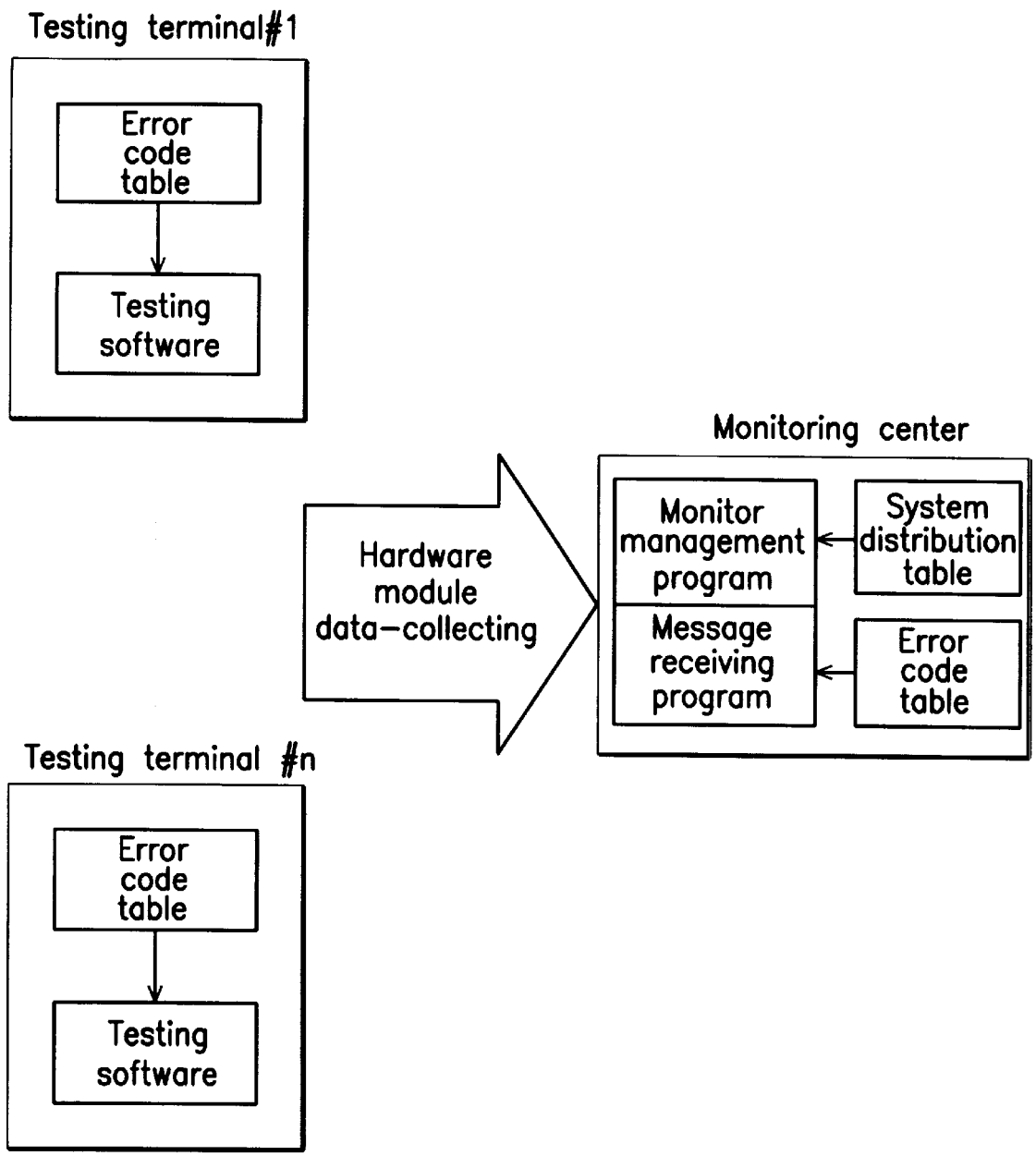
FIG. 3 is a block diagram showing the software configuration in accordance with the present invention.
Figure 4:
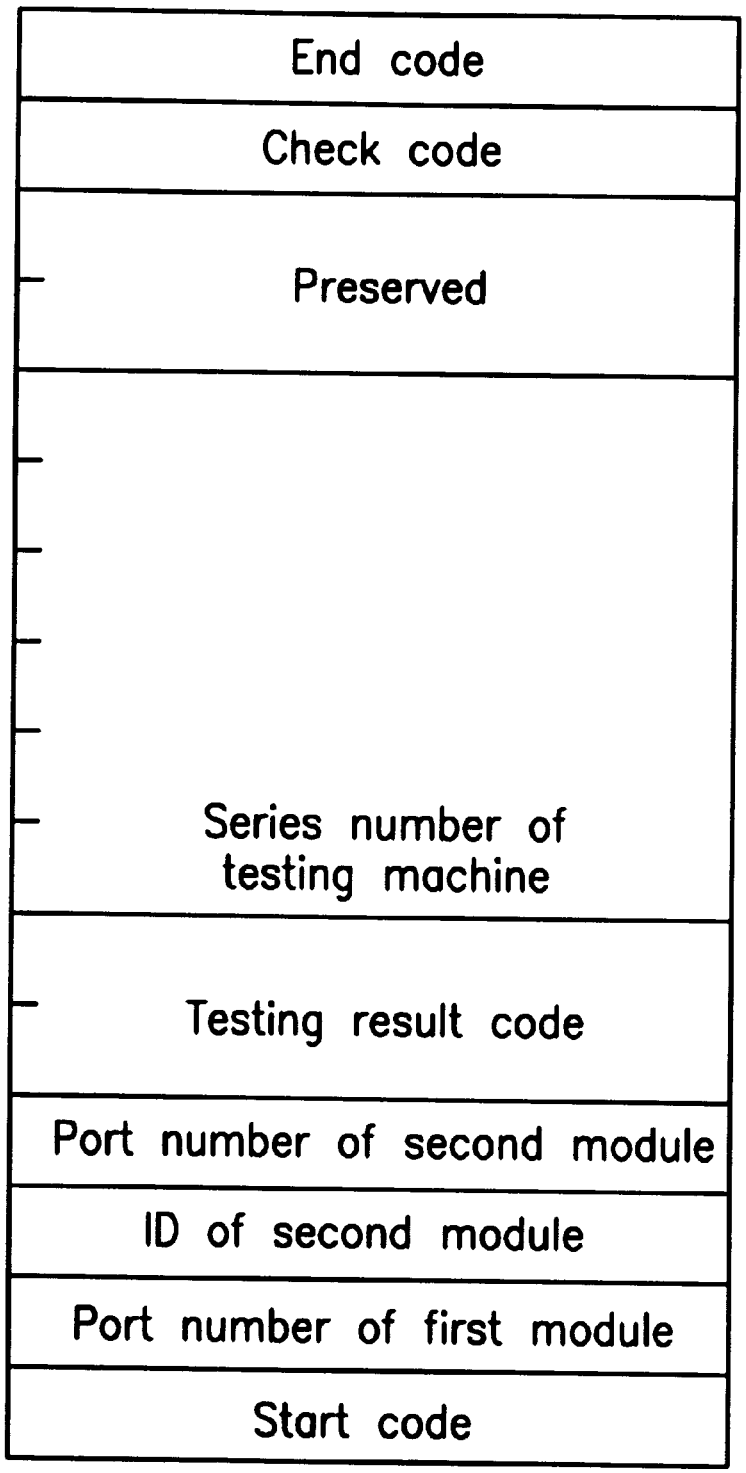
FIG. 4 illustrates a transmitted data format carrying PC burn-in information in accordance with the present invention.

FIG. 3 shows the software configuration of the present invention. The machine undergoing testing runs the test program. When an error occurs, the corresponding error code can be found in a pre-defined error code table. The error code is transmitted to and processed by monitoring device 1 via a hardware network. The monitoring device 1 receives the error signal via a error-signal receiving program, and finds its corresponding error message through the error code table. The error signal is then displayed on the screen of the monitoring device 1 via a monitoring management program incorporating a system distribution table. Because such information is displayed by window type, it is easy to know which machine has produced an error. When the machine being tested runs the testing program normally, a normal signal will be sent to the monitoring device 1 every ten minutes. When the monitoring device 1 does not receive a normal signal from some machines over ten minutes, that means that these machines have been shut down. On the screen of the monitoring device 1, a red light represents a "shut down" state, a yellow light represents a "error" state and a green light represents a "normal" state. In addition, some number indicators are used to represent the total number of machines being tested and the number of failed machines. Detailed information about each error can be obtained by using a mouse to depress a dedicated bottom on the screen. For example, error items, error-occurrence time and times, and the total testing time are all displayed on the screen. This allows real-time management. Before each machine undergoes a functional test, the series number should be recorded in a memory device of the machine. As shown in FIG. 4, each error signal from a machine carries a series number for indicating the generating machine. All the data of the machines can be filed by its carried series number. Consequently, all the data can be traced by the series numbers even after the machines are sold.

Before starting the burn-in testing program, a resident data-capturing program is previously executed. After starting the burn-in testing program, the test result is thereby captured by the resident program of the tested PC 7 or the like. The error message is processed via the data-capturing program, compressed and transmitted to the corresponding fourth module 40. Finally, all the data are collected by the monitoring device 1. FIG. 4 shows an example of a 16-bit data format.

After the monitoring device 1 concentrates the data from the fourth module 40, the burn-in state of each PC 7 can be established by reading time built in the monitoring device 1. The burn-in state comprises the burn-in time of each PC 7, error items encoded from a error result code, and so on. When an operator finds an error message displayed on the screen of the monitoring device 1, the operator can take action as soon as possible. Not only is time saved, but whole production quality is improved. In addition, a complete record of test data has been established.

A window screen on the monitoring device 1 is helpful to justify the real location of the PCs 7 undergoing testing that produce some errors. Further, the causes and items of errors can be real-time displayed on the monitoring device 1. Through a network, the result of the tested PC 7 requiring maintenance will be sent to a maintenance station or be printed out for convenient management.

Because all results can be identified by the monitoring device 1 as soon as possible, man-power cost are reduced and maintenance time is shortened. All the test results are stored on a hard disk of the monitoring device 1, so the reason why the errors occurred and the burn-out percentage of the machines undergoing testing can be understood through program analysis. Accordingly, the yield is improved and the cost is reduced.

This embodiment applies three kinds of network interface. The RS-232 interface utilized in the interface 2 and the interface 6 has a characteristically short transmission distance. Because both the monitoring device 1 and the first module 10 are placed in a monitoring center; and both the tested PC 7 and the fourth module 40 are placed on the same line board, the RS232 interface is utilized in the monitoring device 1 and tested PC 7. The interface 5 utilizes the infrared interface because both the tested PC 7 and the fourth module 40 are placed on the same line board of a moving conveyor belt. The RS-485 interface utilized in the interface 3 and the interface 4 has a characteristically long transmission distance. So the RS-485 interface is suitable for the long transmission distance between the third module 30 and the second module 20 (both in the burn-in room) and the first module 10(in the monitor center). On the other hand, the hierarchical configuration of the test points can be enlarged.

Figure 5:
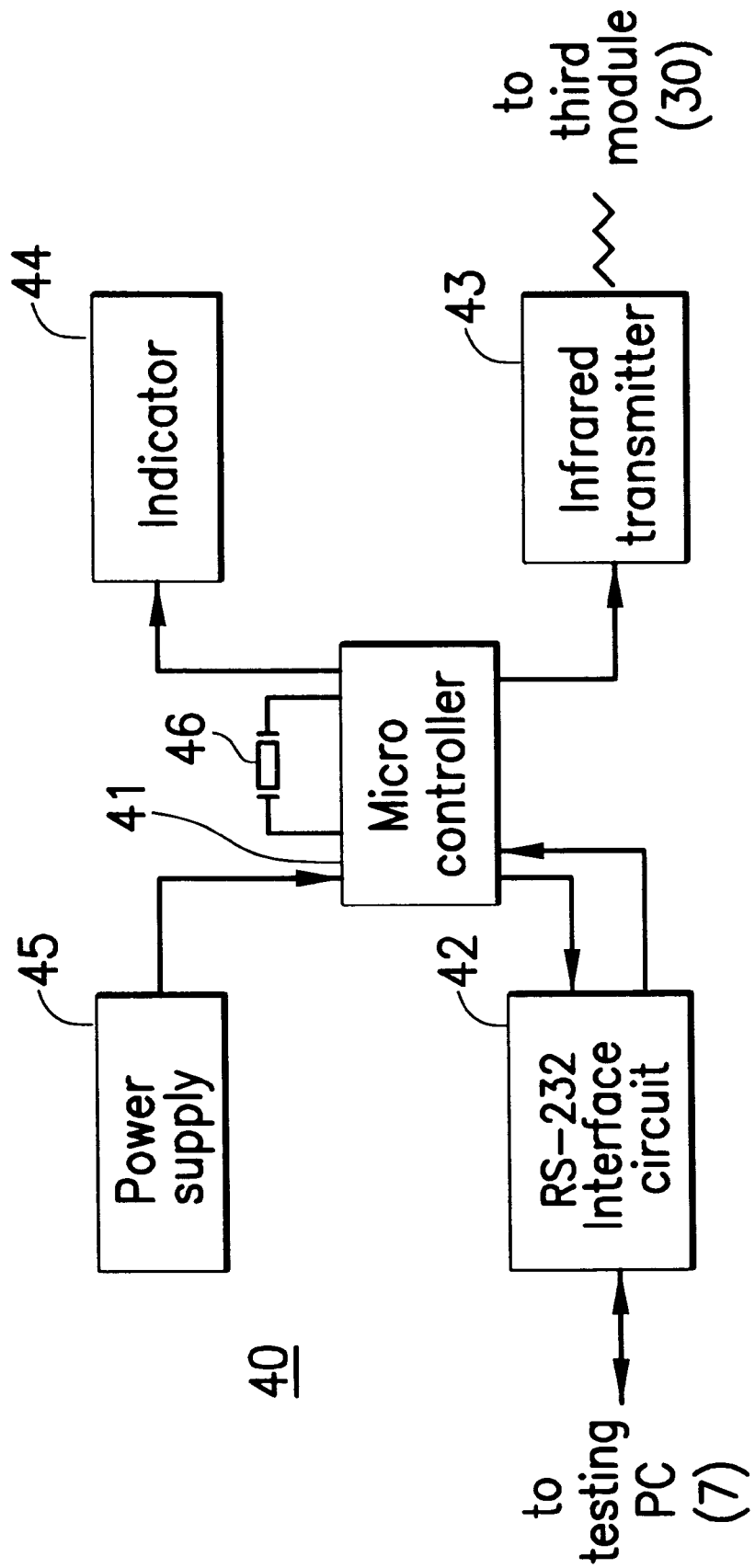
FIG. 5 is a block diagram of the fourth module in the data collection system using the conveyor belt scheme.

FIG. 5 shows a block diagram of the fourth module 40. Each fourth module 40 contains a microcontroller 41(an oscillator 46 functioning as the system clock), a RS-232 interface 42, an infrared transmitter 43, an indicator 44, and a power supply 45. The microcontroller 41 is the control center of the fourth module 40. The microcontroller 41 comprises ROMs and a few RAMs. The ROMs store the program executed in the fourth module 40 and control other devices in the fourth module 40. The RAMs acts as a system memory device and a data buffer. The oscillator 46 is a system clock of the microcontroller 41. The frequency of the oscillator 46 should be related to the transmission speed of the RS-232 interface 42. In this embodiment, the frequency of the oscillator 46 is 7.3728 MHz. The RS-232 interface 42 communicates with the built-in RS-232 interface of the tested PC 7 that receives data and transmits the data into the buffer via the serial port of the microcontroller. The RS-232 interface 42 comprises a chip ICL232 that operates at a voltage of +5V. Then the data stored in the buffer of the microcontroller 41 is sent to the corresponding third module 30 via the infrared transmitter.

The indicator 44 shows the state of the tested PC and the state of the transmission interface. Operators not in the monitoring center or not looking at the machine undergoing testing can inspect the LED of the indicator 44 to identify the results and maintain quality. The power supply 45, supplying power to the fourth module 40, is provided by keyboard connector with a cable.

Figure 6:
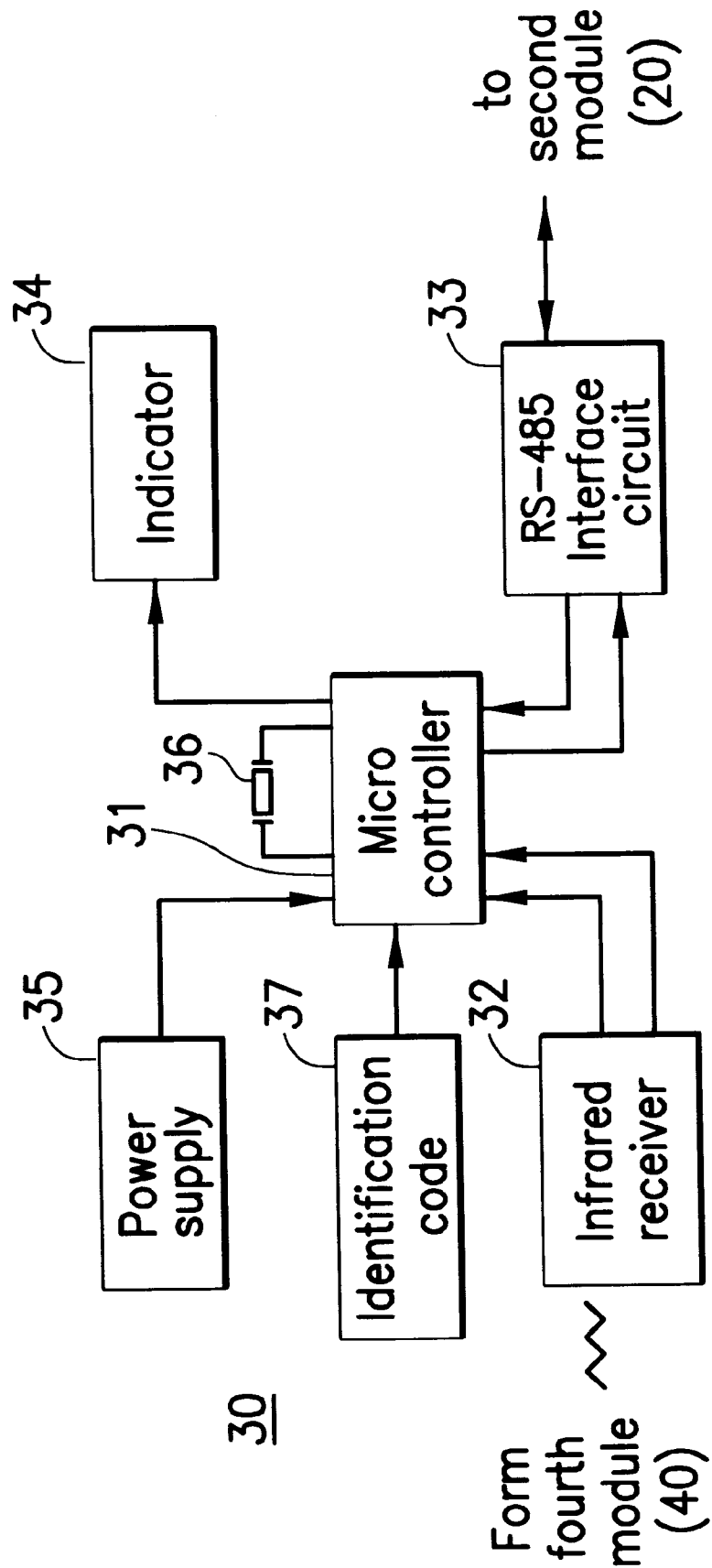
FIG. 6 is a block diagram of the third module in the data collection system using the conveyor belt scheme.

FIG. 6 shows a block diagram of the third module 30. A third module comprises a microcontroller 31, an oscillator 36, an infrared receiver 32, a RS-485 interface 33, an indicator 34, a power supply 35, and an identification code 37. The infrared receiver 32 receives the infrared data from the fourth module 40 and store the data in a buffer in the microcontroller 31. The RS-485 interface 33 allows the serial port of the microcontroller 31 to function as a standard RS-485 interface. The data stored in the buffer is sent to the second module 20 via the RS-485 interface 33.

As mentioned above, each port of the second module 20 connects to as many as 32 sets of the third modules 30 to form a cycle. An identification code 37 stored in the microcontroller 31 represents the identification code of the third module 30 in this cycle. Each third module 30 in this cycle is supplied by a +12V power supply. Because of the voltage drop due to the long distribution line, the actual amount of power supplied will be regulated to +5V.

Figure 7:
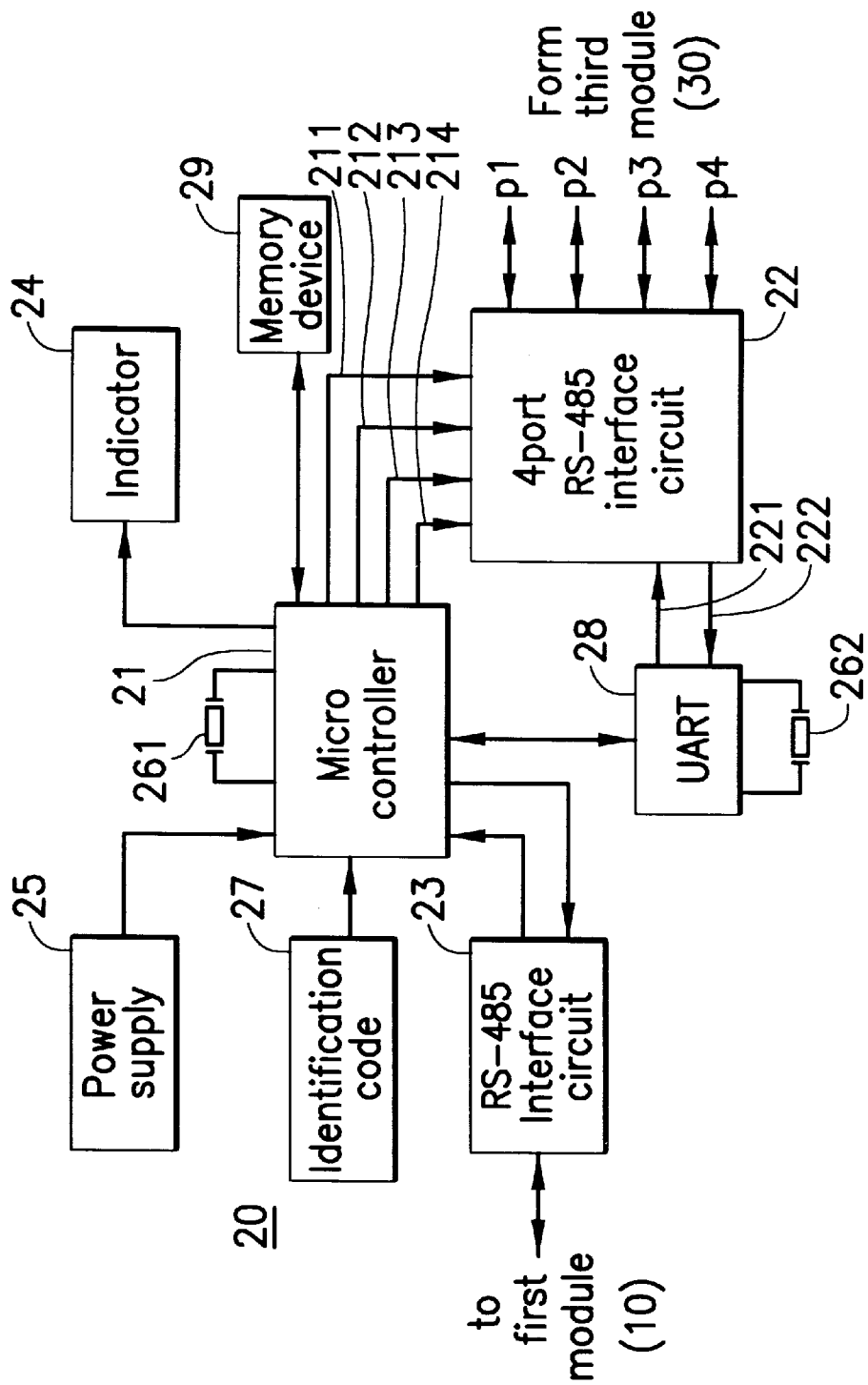
FIG. 7 is a block diagram of the second module in the data collection system using the conveyor belt scheme.

FIG. 7 shows a block diagram of the second module 20. A second module comprises a microcontroller 21, a 4-port RS-485 interface 22, an RS-485 interface 23, an indicator 24, a power supply 25, an identification code 27, an UART 28(Universal Asynchronous Receiver & Transmitter), and a memory device 29. The second module 20 connects to as many as 32×4=128 sets of the third module 30 through the four ports P1, P2, P3 and P4 of the 4-port RS-485 interface 22. In general, a microcontroller 21 has only one serial port. However, the second module 20 requires two serial interfaces. The other port is provided by UART 28. One of the four ports P1, P2, P3 and P4 is connected to the data in/out lines 221 and 222 via the select lines 211, 212, 213 and 214. Because the internal RAM in the microcontroller 21 is not sufficient to store the data, the data is stored in the memory device 29. Then the data is sent to the first module 10 via the RS-485 interface 23. The oscillator 262 acts as a system clock of the UART 28. The frequency of the oscillator 262 is 1.8432 MHz.

Figure 8:
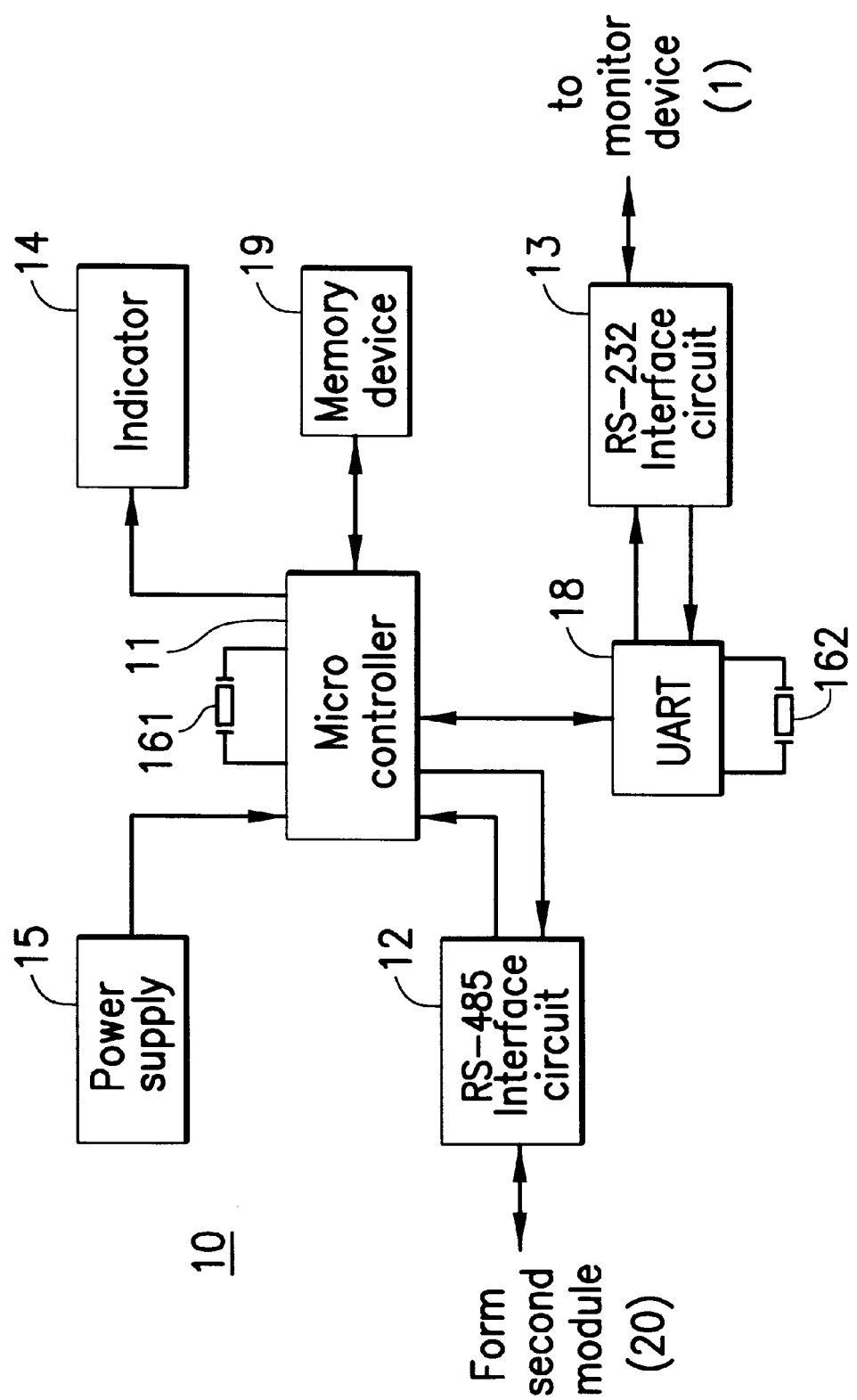
FIG. 8 is a block diagram of the first module in the data collection system using the conveyor belt scheme.

FIG. 8 shows the block diagram of the first module 10. A first module comprises a microcontroller 11, a RS-485 interface 12, a RS-232 interface 13, an indicator 14, a power supply 15, an UART 18, and a memory device 19. Similar to the second module, the first module 10 also requires two serial interfaces. The other port is provided by UART 18. The indicator 14 is similar to the indicator 24 of the second module 20. The data from the second module 20 should be stored in the memory 19 first. When the data is to be analyzed, the data will be sent to the monitoring device 1 through the RS-232 interface 13. Further, the power supply 15 for the first module and the power supply 25 for the second module are both +5V.

The present invention is suitable for the mode of a platform vehicle. Because the number of the platform vehicles and the number of the testing machines on a platform vehicle change often, this system is designed in a hierarchical configuration. When a new platform vehicle is placed in a burn-in room, this system will detect a new distribution configuration automatically. A distribution configuration comprises how many second modules there are; how many ports there are in each second module; and how many tested machines are connected to each port. The new configuration then indicated on the screen of the monitoring computer. The states can be identified as soon as possible.

Figure 2:
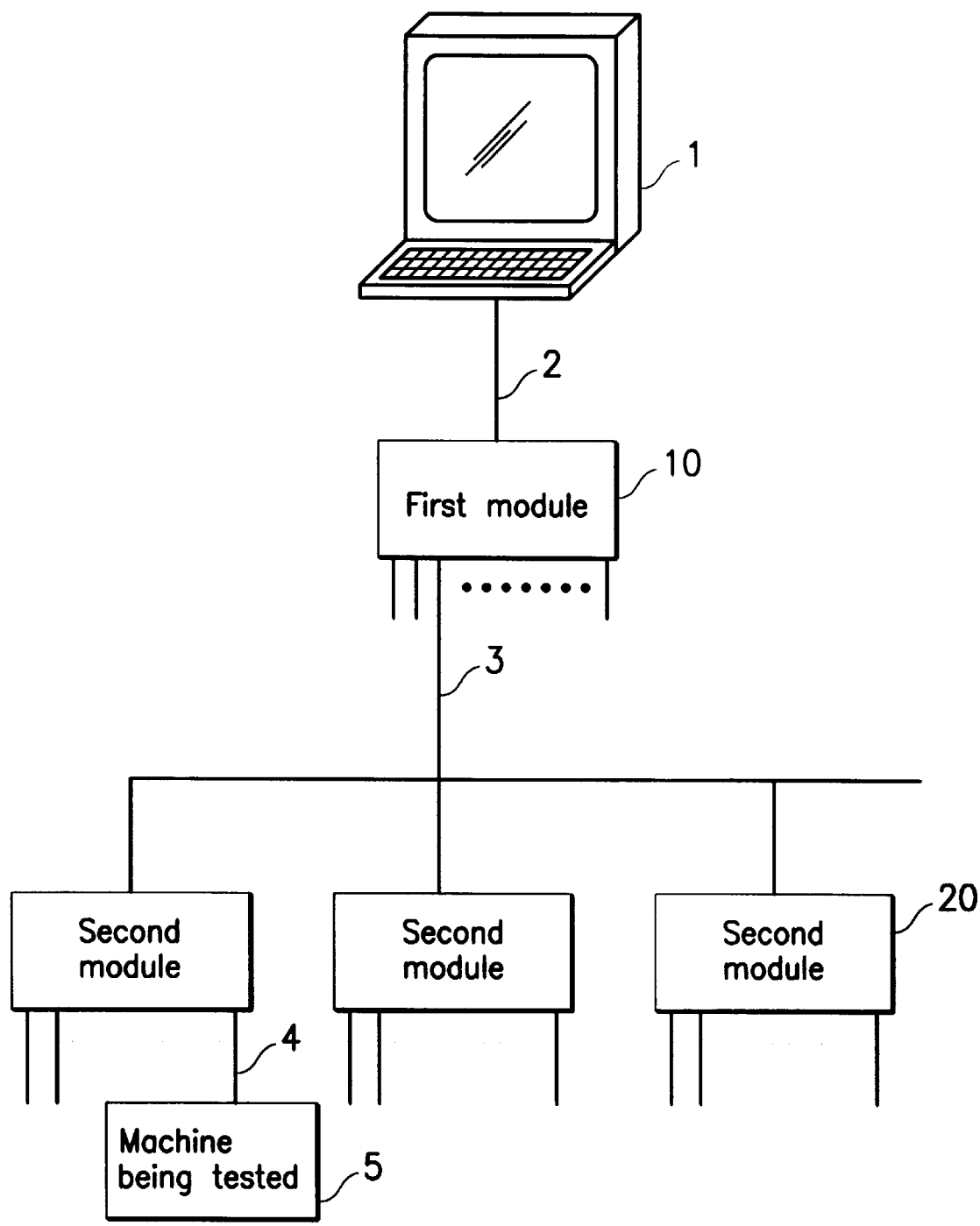
FIG. 2 is a system block diagram of the multi-port data collection system in accordance with the present invention using the platform vehicle scheme during burn-in testing.

FIG. 2 shows the system configuration of a multi-port data-collecting system of the present invention in the platform vehicle mode. In this embodiment, the monitoring device 1 monitors the state of a tested machine 5. The result is sent to the monitoring device 1 via the configuration formed of the first module 10 and the second module 20. In the burn-in room, when the platform vehicle is connected to a power supply and a signal line, a functional test is starting. This system should have a considerable distribution ability because the number of the machines on a platform is variable. The results of the tested machine 5 are sent to the second module 20 via a RS232 interface 4. This is very convenient because most machines having a CPU are fitted with such RS232 interfaces. All the data from RS232 will be stored in a memory device first. Then all the data will be sent to the first module 10 via a RS485 interface 3. The first module 10 receives all the data from the second module 20 by polling and stores the data in a buffer. Then the data will be sent to the monitoring device 1 via a RS232 interface 2. The power for the second module on a particular platform vehicle is supplied by a power supply on that particular platform vehicle. The cables of each RS232 port in the second module are connected to where the tested machines is placed. When the tested machines are placed on a platform vehicle, the tested machines will be connected to the cables and the power of the tested machines. Then the signal is connected. The RS485 cables are connected to the ports of the first module 10. The second module 20 can be connected to the RS485 cable 3. Then a new configuration will be shown on the monitoring device 1 by the software.

Figure 9:
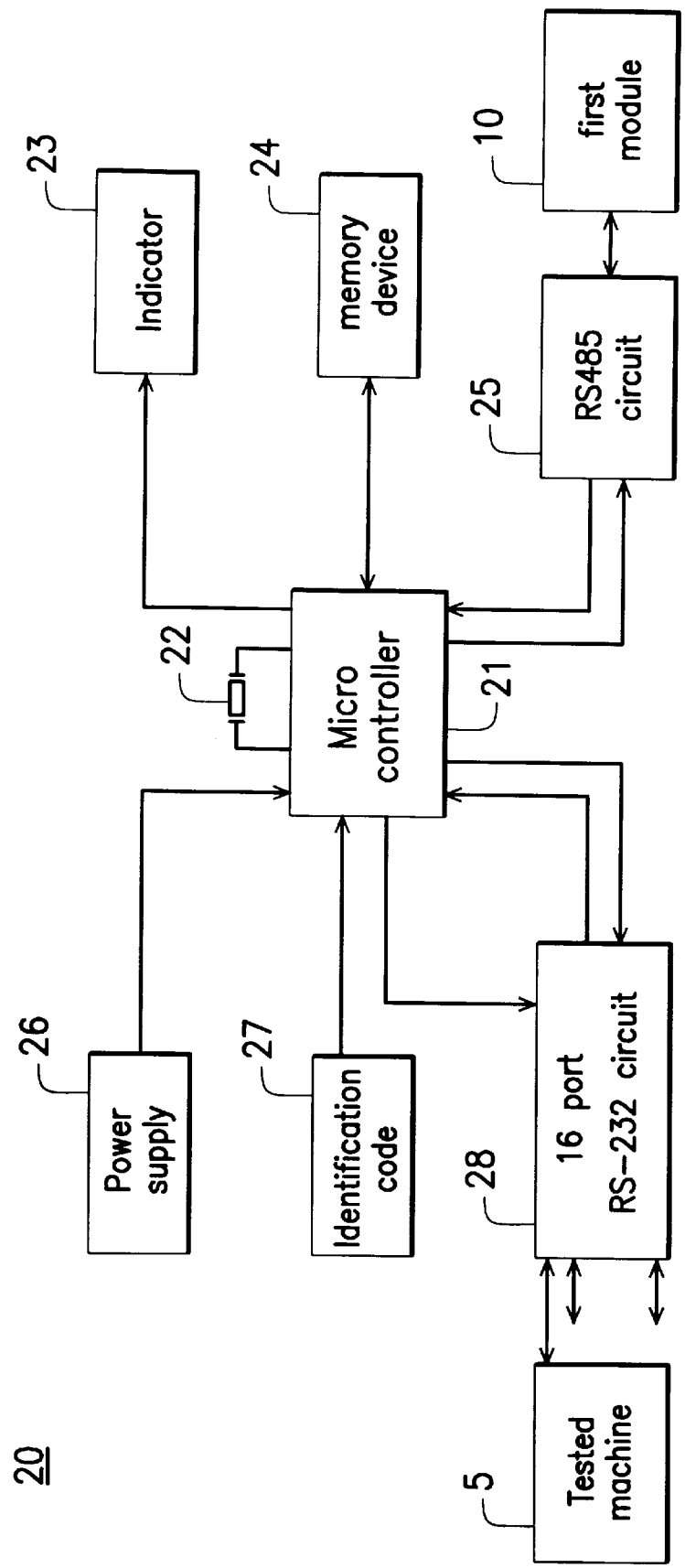
FIG. 9 is a block diagram of the second module in the data collection system using the platform vehicle scheme.

FIG. 9 is a block diagram of the second module, wherein the microcontroller 21 is the center of the second module. The ROM in the microcontroller 21 can store functional programs for this module. An oscillator 22 provides a work frequency of the microcontroller. Because a RS485 interface 25 uses the serial port of the microcontroller 21, the frequency selection of the oscillator 22 should correspond to the transmission speed of the RS485 interface by frequency division. An indicator 23 is driven by some LEDs. The LEDs can be used to represent all the states of the tested machines. The power supply 26 supplies power. The memory device 24 is used as a data register. When some signals are received from the tested machines, the microcontroller 21 will store the data in different buffers for different ports. The data is then sent via the RS485 interface 25. An identification code 27 represents the address of the second module. The RS485 utilizes the serial ports of the microcontroller 21. The number of the serial ports is as many as 32. The 16-port RS232 interface 28 has 16 ports respectively connected to each tested machine 5. The difference between the RS232 interface and the RS485 interface is that the RS232 has a short transmission distance while the RS485 has a long transmission distance.

Figure 10:
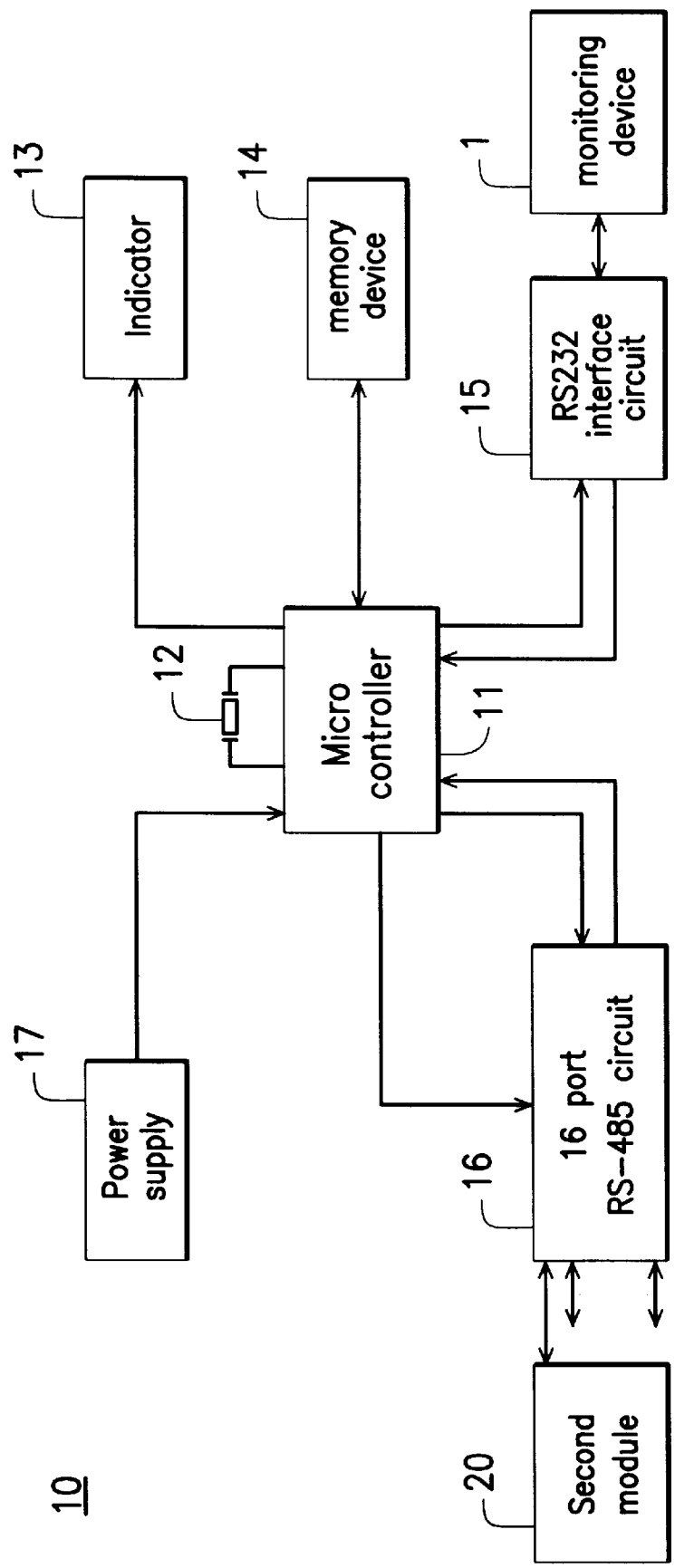
FIG. 10 is a block diagram of the first module in the data collection system using the platform vehicle scheme.

FIG. 10 is a block diagram of the first module. The first module comprises a microcontroller 11, an oscillator 12, an indicator 13, a memory device 14, a RS232 interface 15, a 16-port RS485 interface 16, and a power supply 17. The microcontroller, the center of the first module, controls all operations of this module. The indicator 13 is a LED circuit indicating all the states of this module. The oscillator 12 provides a clock frequency to the microcontroller 11. The frequency selection of the oscillator 12 should correspond to the transmission speed of the RS232 interface. The power supply is an independent power supply to provide +5V to this module. The circuit connected to the second module 20 is the 16-port RS485 interface 16. The 16-port RS485 interface 16 is a differential mode interface with a long transmission distance. Each port can connect as many as 32 sets of the second module. If the address O is used as "reset", and the address 31 is used as "broadcast", each port can only connect as many as 30 sets of the second module. Each second module has 16 RS232 inputs, the maximum sets this system can monitor is 7680 (16×30×16=7680).

FIG. 4 is a 16-byte data transmission format. The transmission byte comprises the port number of the first module, the ID of the second module, the port number of the second module, test result code, the series number of the tested machines, etc. When the monitoring device 1 receives all the data from each tested machine 5, a data base can be adjusted according to these series number. The system configuration is shown in a window environment. In accordance with the window, which tested machine develops errors can be easily known. This allows convenient maintenance and management. Not only the test states but also the reason for an error produced by the tested machine can be known via the monitoring device 1.

The foregoing description of preferred embodiments the present invention has been provided for the purposes of illustration and description. It is not intended to be exhaustive or to limit the invention to the precise forms disclosed. Many modifications and variations will be apparent to practitioners skilled in this art. The embodiments were chosen and described to best explain the principles of the invention and its practical application, thereby enabling others skilled in the act to understand the invention for various embodiments and with various modifications as are suited to the particular use contemplated. It is intended that the scope of the invention be defined by the following claims and their equivalents.

What is claimed is:

1. A multi-port data collection system for monitoring states of a plurality of machines undergoing testing, which executes a program for functional testing and sends out the test results via a hierarchical structure, comprising:

a monitoring device;

a first module, controlled by said monitoring device via a first data interface; and a plurality of second modules, controlled by said first module via a second data interface and connected to said tested machines via a third data interface, for collecting the test results of said machines undergoing testing and sending the test results to said monitoring device via said first module, the second module comprises:

a microcontroller, for controlling a data-collecting sequence;

an indicator, connected to said microcontroller, for showing a state message;

a memory device, connected to said microcontroller, to serve as a register for the test results;

a second data interface circuit, for connecting between said second data interface and said microcontroller; and a third data interfaced circuit, for connecting between said third data interface and said microcontroller.

2. The system of claim 1, wherein said microcontroller is driven by an oscillator.

3. The system of claim 1, wherein said second module further comprises an identification code circuit.

4. The system of claim 1, wherein said indicator is an LED circuit.

5. The system of claim 1, wherein said second data interface circuit comprises an UART (Universal Asynchronous Receiver and Transmitter) circuit.

6. The system of claim 1, wherein said first module comprises:
- a microcontroller, for controlling a data-collecting sequences;
- an indicator, connected to said microcontroller, for showing transmission state;
- a memory device, connected to said microcontroller, to serve as a register for storing data from said second module;
- a first data interface circuit, for connecting between said first data interface and said microcontroller; and
- a second data interface circuit, for connecting between said second data interface and said microcontroller.

7. The system of claim 6, wherein said microcontroller is driven by an oscillator.

8. The system of claim 6, wherein said indicator is an LED circuit.

9. The system of claim 6, wherein said second data interface circuit comprises a UART circuit.

10. The system of claim 1, wherein said first data interface utilizes an RS232 interface.

11. The system of claim 1, wherein said second data interface utilizes an RS485 interface.

12. The system of claim 1, wherein said third data interface utilizes an RS232 interface.

13. The system of claim 1, wherein said monitoring device is a monitor computer.

14. The system of claim 1, wherein said results comprise a test result code, a series number of said tested machine, a port number of said second module, an ID of said second module, and a number of said first module.

15. The system of claim 1, wherein the test results from said test program are captured by a resident program or are directly written to a RS232 port.

* * * * *